Nov. 7, 1944.  W. P. McKINNIE  2,362,016
RETRACTABLE LANDING GEAR
Filed June 24, 1941
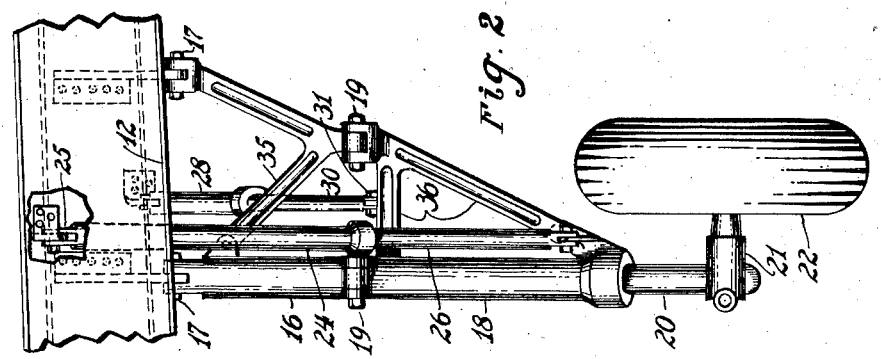
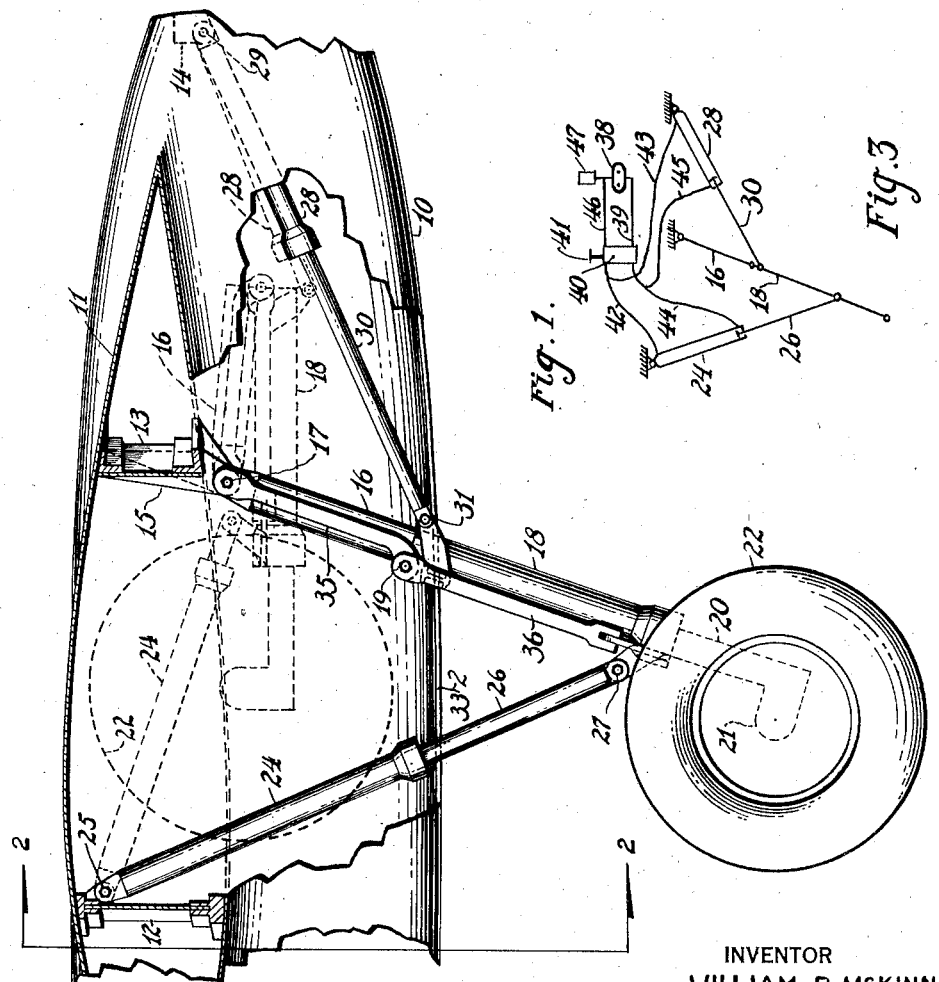
INVENTOR
WILLIAM P. McKINNIE
BY
ATTORNEY Patented Nov. 7, 1944

2,362,016

UNITED STATES PATENT OFFICE 2,362,016

RETRACTABLE LANDING GEAR

William P. McKinnie, Kenmore, N. Y., assignor to Curtiss-Wright Corporation, a corporation of Delaware Application June 24, 1941, Serial No. 399,442

8 Claims. (Cl. 244—102)

This invention relates to retractable landing gears for aircraft and has for a particular object provision of a landing gear structure enabling the landing wheels to be extended and retracted along a path which is substantially vertical with respect to the aircraft.

Although most modern aircraft utilize retractable landing gears in one form or another, most of them provide a landing gear movement in which the main weight of the gear is shifted forwardly and rearwardly, thus affecting the center of gravity of the aircraft as a whole. It is a further object of the invention to overcome the tendency towards shift of the aircraft center of gravity by landing gear retraction or extension. A further object is to provide a landing gear which may be raised and lowered along a vertical path, thereby minimizing the size of apertures in the lower part of the aircraft body through which the landing gear passes. An additional object in line with the above, is to maintain the maximum possible continuous surface on the under side of the aircraft body.

Further objects of the invention will become apparent in reading the annexed description in connection with the drawing, in which:

Fig. 1 is a side elevation partly broken away, of an aircraft nacelle and wing embodying the landing gear of this invention;

Fig. 2 is a front elevation of the landing gear; and

Fig. 3 is a diagrammatic side elevation showing the means by which the landing gear may be extended and retracted.

Fig. 1 shows a nacelle 10 which may, in the usual manner, extend forwardly to carry one of the aircraft power plants, not shown. The nacelle may as usual be disposed along the span of a wing 11 which is provided with a front spar 12 and a rear spar 13 forming the main structural members thereof. Within the nacelle 10, an added structural anchorage 14 is provided.

To the rear spar 13, a hinge bracket 15 is secured to which the upper portion of a main strut 16 is hinged at 17. To the lower end of the upper main strut portion 16, a lower main strut portion 18 is hinged on a pivot 19. The strut portion 18 comprises a shock absorber from the lower end of which a plunger 20 extends at the bottom end of which a wheel axle 21 and a wheel 22 are attached. To the front spar 12, a cylinder 24 is hinged at 25, and telescoping within this cylinder is a plunger 26 whose lower end is hinged at 27 to the lower end of the lower main strut portion 18. To the nacelle structural anchorage 14 a cylinder 28 is hinged at 29, this cylinder carrying a telescoping plunger 30 hinged at its lower end, at 31, to the upper end of the lower main strut portion 18. The landing gear is shown in solid lines in its extended position. If fluid pressure be directed to the lower ends of the cylinders 24 and 28, at the same time, plungers 26 and 30 respectively, are retracted within the cylinders, buckling the strut 16, 18 at the intermediate hinge 19 and folding the landing gear compactly within the nacelle 10 in the position shown in dotted lines. By the disposition of the hydraulic struts 24, 26 and 28, 30, respectively forwardly and rearwardly of the main strut 16, 18, the wheel 22 is caused to move in a substantially vertical path between its extended and retracted positions thus minimizing any change in the center of gravity position of the landing gear and likewise minimizing any change of the center of gravity position of the aircraft as a whole. Furthermore, it is only necessary to provide a small aperture 33 in the lower surface of the nacelle 10 to permit of landing gear extension and retraction.

To provide lateral stability for the aircraft, an upper lateral bracing frame 35 is secured to and is movable with the upper portion 16 of the main strut, and a lower lateral bracing frame 36 is secured to and is movable with the lower portion 18 of the main strut. The pivot axes for the lateral frames 35 and 36 bear the same reference numerals as the corresponding pivot axes for the strut portions 16 and 18.

Fig. 3 shows diagrammatically the means by which landing gear extension and retraction is accomplished. A power driven hydraulic pump 38 delivers pressure fluid through a line 39 to a valve 40 which may be adjusted by a handle 41 to deliver pressure fluid to flexible hoses 42 and 43, for landing gear extension, leading to the top ends of the cylinders 24 and 28 respectively. When the valve is so adjusted, fluid in the lower portion of the cylinders returns through hoses 44 and 45 to the valve 40 whence it passes through a pipe 46 to the intake side of the pump. A fluid reservoir 47 is connected to the pump intake.

By adjusting the valve 41 to the other position, fluid pressure may be directed to the hoses 44 and 45 to effect landing gear retraction, and in this positon of the valve 40, fluid in the cylinder upper ends is returned through the hoses 42 and 43 to the valve and to the pump intake.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an aircraft retractable landing gear, a main landing gear strut hinged at one end to the aircraft and having a wheel at its other end, said strut being hinge jointed between its ends, a first adjustable-length means connecting said strut, adjacent the joint thereof, with said aircraft, a second adjustable-length means connecting said strut, adjacent its wheel carrying end, with said aircraft, and a motor to adjust the length of said means coincidentally.

2. In an aircraft retractable landing gear, three fore-and-aft spaced pivots in the aircraft, a strut journalled on each pivot, the central one of said struts being hinged at one end to the aircraft and jointed between its ends, the other struts including means for altering the length thereof, one of said other struts being jointed to the central strut toward its middle, the other of said other struts being jointed to the central strut adjacent its free end, and a landing device journalled on and toward the free end of said central strut.

3. In an aircraft retractable landing gear, a substantially centrally jointed strut hinged at one end to the aircraft, means connected with said strut adjacent said joint, means connected with said strut adjacent the free end thereof, both said means comprising adjustable devices by which the position of the portions of the jointed strut parts, relative to the aircraft, may be altered, and a landing device carried by said strut.

4. In an aircraft retractable landing gear, a jointed wheel carrying strut swingably mounted on the aircraft, and telescoping brace struts hinged to the aircraft and to two points along the wheel carrying strut, said brace struts being extendable and retractable to break the wheel strut joint and to extend and retract the wheel strut relative to the aircraft.

5. In aircraft having a landing gear housing, a first buckling strut hinged at its upper end in the housing, said strut when the landing gear is in operative position extending downwardly and forwardly from its hinge, a second telescoping strut hinged at its upper end in the housing forwardly of the first strut hinge and extending downwardly and rearwardly therefrom to an intersection with the first strut, said struts being hinged to each other at their lower ends, and a third telescoping strut hinged at its upper end to the housing and extending downwardly and forwardly to intersect the first strut intermediate its ends, said second and third struts being jointly operable in telescoping to buckle the first strut and to retract all said struts within the housing.

6. In an aircraft retractable landing gear, a landing gear strut hinged at its one end to the aircraft and carrying a wheel at its other end, said strut having a hinge joint intermediate its ends, a telescoping strut hinged at one end to the aircraft and at its other end to said landing gear strut adjacent said hinge joint, a second telescoping strut hinged at one end to the aircraft and at its other end to said landing gear strut near the wheel carried thereby, and means to extend and retract both said telescoping struts coincidentally.

7. In an aircraft retractable landing gear, a main landing gear strut hinged at one end to the aircraft and having a wheel at its other end said strut having a hinge joint intermediate its ends, a first lengthwise adjustable means connecting said strut adjacent the joint thereof, with said aircraft, a second lengthwise adjustable means connecting said strut, adjacent its wheel carrying end, with said aircraft, and means to jointly operate said first and second adjustable means to buckle said landing gear strut.

8. In an aircraft retractable landing gear, a main landing gear strut hinged at one end to the aircraft and having a wheel at its other end, said strut having a hinge joint intermediate its ends, a first lengthwise adjustable means connecting said strut, adjacent the joint thereof, with said aircraft, a second lengthwise adjustable means connecting said strut, adjacent its wheel carrying end, with said aircraft, said main landing gear strut and said first and second adjustable means all being disposed in a substantially common vertical plane with said first and second adjustable means disposed on opposite sides of said main landing gear strut, and means to jointly operate said first and second adjustable means to buckle said landing gear strut.

WILLIAM P. McKINNIE.